INVENTORS.
NOBORU AMANO and TOMOZO FURUKAWA.
BY
ATTORNEY.

United States Patent Office 3,444,461
Patented May 13, 1969

3,444,461
SYSTEM FOR MEASURING THE PERIOD OF A NUCLEAR REACTOR BY MEASURING THE FREQUENCY OR PERIOD DIFFERENCE OF NON-SIMULTANEOUSLY GENERATED SIGNALS
Noboru Amano and Tomozo Furukawa, Mito, Japan, assignors to Nihon Genshiryoku Kenkyu sho, Minato-ku, Japan
Continuation-in-part of application Ser. No. 222,833, Sept. 11, 1962. This application Sept. 9, 1965, Ser. No. 486,177
Claims priority, application Japan, Nov. 7, 1961, 36/40,174
Int. Cl. G21c *17/14*
U.S. Cl. 324—68                         3 Claims This is a continuation-in-part application of our copending application Ser. No. 222,833 filed Sept. 11, 1962, now abandoned. Priority of corresponding Japanese patent application No. 36/40,174 is also claimed for all subject matter common therewith as per certified copy of the priority document deposited in the parent case.

The present invention relates to a system for measuring the period of a nuclear reactor, and preferably to such a system for measuring a relatively long period in which the power level of a reactor is increased or decreased extremely slowly. Measurements of such a period of a nuclear reactor could not be accomplished by the prior art.

The definition of the period P of a nuclear reactor is shown in Equation 1 relative to the neutron flux $N(t)$ of the nuclear reactor, the neutron flux being a function of time.

$$P = \frac{N}{\frac{dN}{dt}} = \frac{1}{\frac{d\ln N}{dt}} \quad (1)$$

The method of the prior art to obtain the period P of a nuclear reactor is as follows: Period P is measured in the form of the inverse reactor period by getting the time derivative of a signal proportional to the logarithm of neutron flux N which is obtained by means of a conversion circuit abbreviated as a Log N amplifier. In this method of the prior art a good response to a rapid change is obtained as a differentiation circuit is utilized. Therefore, when the neutron flux N is increasing or decreasing extremely slowly, the signal due to the period of a nuclear reactor cannot be measured since the signal due to the fluctuation of the neutron flux masks the signal due to the period of a nuclear reactor.

In the system for measuring the period of a nuclear reactor of this invention, the influence of said fluctuation is smoothed out by means of a method equivalent to obtaining the mean value of the period of a nuclear reactor for each predetermined time interval, so that a relatively long period of a nuclear reactor can be measured.

It is an object of this invention to provide a system for measuring the period of a nuclear reactor in which the power level of said reactor is changed extremely slowly by means of a method taking account of the mean value of the period of a nuclear reactor for each predetermined time interval.

The principle of subject invention is explained by means of equations. Analogue signals proportional to the neutron flux of a nuclear reactor are converted into electric signals with oscillating frequencies or periods proportional to the logarithm thereof.

In general, the relation shown in Equation 2 is established.

$$f = K_1 \ln N \quad (2)$$

Where $f$ = frequency of the oscillator $N$ = neutron flux $K_1$ = constant

Assuming that the neutron flux at time $t_1$ is $N_1$ and at time $t_2$ is $N_2$, period P of a nuclear reactor is given by Equation 3.

$$P \doteq \frac{1}{\frac{\ln N_2 - \ln N_1}{t_2 - t_1}} \quad (3)$$

From Equation 2 it follows that about frequencies $f_1$ and $f_2$ at times $t_1$ and $t_2$ respectively, develop as follows:

$$f_1 = K_1 \ln N_1$$
$$f_2 = K_1 \ln N_2 \quad (4)$$

Therefore, period P is modified as shown in Equation 5.

$$P \doteq \frac{K_1}{\frac{f_2 - f_1}{t_2 - t_1}} = \frac{K_1}{\frac{\Delta f}{\Delta t}} \quad (5)$$

Where $\Delta f = f_2 - f_1$
$\Delta t = t_2 - t_1$

Thus, it is seen that the period P can be measured by obtaining the frequency difference in the oscillations at a time difference $\Delta t$. The same method may be employed when the analogue signals proportional to the neutron flux are converted into electrical oscillators whose period is proportional to the logarithm of the signals. If Equation 6 is established, then period P can be obtained by the period difference in the oscillator at a time difference $\Delta t$ shown in Equation 7.

$$T = K_2 \ln N \quad (6)$$

$$P \doteq \frac{K_2}{\frac{\Delta T}{\Delta t}} \quad (7)$$

Where

T = period of the oscillator
N = neutron flux
$K_2$ = constant
$\Delta T$ = period difference Equation 7 shows that period P can be measured by obtaining the period difference in the oscillator at a time difference $\Delta t$.

In FIG. 1, reference number 12 designates an input terminal of a signal proportional to the neutron flux, reference numbers 2 and 3 oscillators generating a frequency proportional to the logarithm of the input signal at input terminal 1, reference number 4 a mixing circuit which mixes the output coming from oscillators 2 and 3, reference number 5 a filter which transmits only a component of the output of mixing circuit 4 to gate 6, said component being the difference of the frequency between oscillator 2 and oscillator 3, reference number 6 a gate connecting the output of filter 5 with digital-frequency-and-period-meter 7, and reference number 8 control circuit controlling the measuring system.

Equations 5 and 7 mean that the differential operation of Equation 1 is obtained by a value expressed as a mean time and therefore the noise component is equivalently filtered. Thus, the period value is given as the average in the time difference $\Delta t$ and the mean time interval varies in accordance with the value shown by $\Delta t$. For the limiting situation when the time difference $\Delta t$ becomes zero, the instantaneous value of the period is determined.

Hereinafter, the principle of the invention will be explained in greater detail, reference being had to the block diagram shown in FIGS. 1a and 3. FIGS. 3 and 4 demonstrate a concrete method in which an analogue quantity is converted into an electrical oscillation having a frequency or a period proportional to the logarithm of the analogue quantity.

These and other objects of the invention will become apparent to those skilled in the art from the following description and annexed drawings, in which:

FIG. 1b shows wave forms developed by the arrangement of the circuitry shown in FIG. 1a;

Figure 1A:
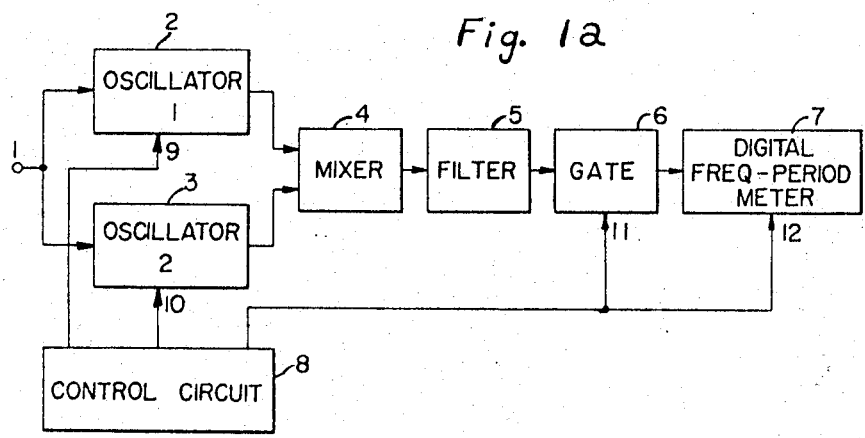
FIGS. 1a and 2 are block diagrams of embodiments of the system for measuring the period of a nuclear reactor using frequency conversion.

In FIG. 1a, the oscillating frequencies of oscillators 2 and 3 are adjusted so as to be equal under the same input of the neutron flux. The frequency of oscillator 2 is temporarily fixed to frequency $f_1$, which corresponds to the neutron flux at time $t_1$, by means of signal 9 coming from control circuit at time $t_1$. Then, the frequency of oscillator 3 is fixed to frequency $f_2$, which corresponds to the neutron flux at time $t_2$, by means of signal 10 coming from control circuit 8. It is understood $t_2 = t_1 + \Delta t$. The input signals each having frequency $f_1$ and frequency $f_2$ are mixed in mixing circuit 4, and an output signal of four components having frequencies $f_1$, $f_2$, $f_1 + f_2$, $f_1 \sim f_2$ is obtained at the output terminal of the mixing circuit 4. By using filter 5, only the component having frequency $f_1 \sim f_2$ is transmitted to gate 6 and the output of filter 5 is fed to digital-frequency-and-period-meter 7 by opening gate 6 which is opened by a signal 11 coming from control circuit 8.

The principle of the digital frequency-and-period meter is conventionally utilized in the prior arts and, therefore, further explanation thereof is unnecessary. If digital-frequency-and-period-meter 7 is used as a frequency meter by means of a signal 12 coming from control circuit 8, the frequency meter counts frequency $f_1 \sim f_2$ for a predetermined time interval. The value counted by digital-frequency-and-period meter 7 is proportional to the inverse period of the reactor. Alternatively, if digital frequency-and-period meter 7 is operated as a period meter by means of a signal 12 coming from control circuit 8 the period meter counts the output of the clock oscillator in the digital frequency-period meter for one period or predetermined periods of the output of filter 5 and therefore, the period of frequency $f_1 \sim f_2$ is obtained, which is proportional to the period of the nuclear reactor. The digital frequency-period meter can be of a type 523D frequency converter made by Hewlett-Packard Co.

Next, the temporary fixing of oscillator 2 is released while frequency $f_2$ of oscillator 3 has been fixed and then the frequency of oscillator 2 is temporarily fixed and frequency $f_3$ at time $t_3$, frequency $f_3$ being a value corresponding to the neutron flux at time $t_3$ and time $t_3$ being a sum of time $t_2$ and time difference $\Delta t$, i.e., $t_3 = t_2 + \Delta t$. The inverse periods or periods of the reactor for frequencies $f_2$ and $f_3$ are obtained by means of a procedure similar to the procedure stated above.

Figure 1B:
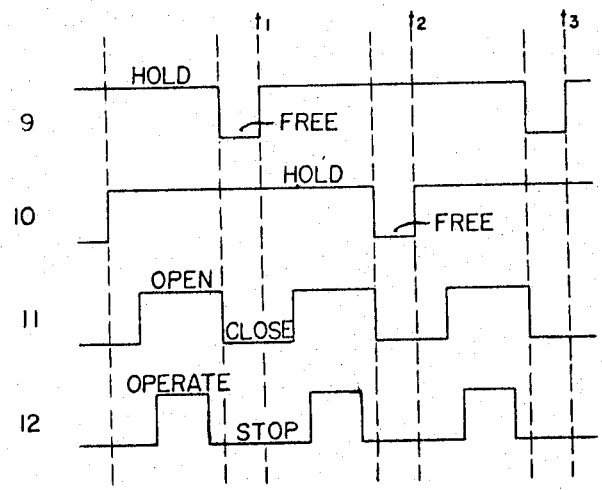

Control circuit 8 is a simple sequence control circuit and sends signals 9, 10, 11 and 12 as shown in FIG. 1b having a proper timed relation at a constant period. An instrument such as a timer initiates change in signal from the control circuit to points 9, 10, 11 and 12. The control signals provided by control circuit 8 thus serve to connect the signal proportional to the neutron flux applied to terminal 1 to the respective oscillators during the time intervals indicated. During the "free" periods, the signal from terminal 1 serves to control the frequency of the respective oscillator. During the "hold" periods, the signal from terminal 1 in the preceding "free" period is held by conventional storage means to maintain the frequency of the oscillator constant during the "hold" period. It is to be understood that the control circuit 8 may comprise a conventional prior art sequence control circuit which will provide the switching functions indicated.

This control circuit is created by an ordinary logical circuit and the timed relation means between signals 9, 10, 11 and 12.

Figure 2:
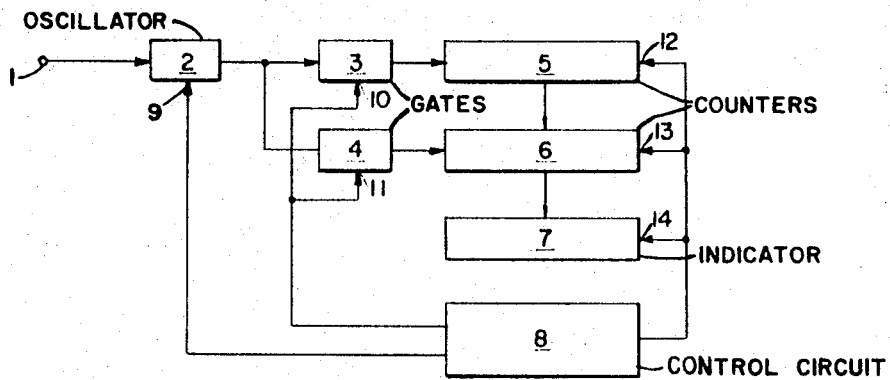

The control circuit in FIG. 1 or 2 has no relation to controlling of the reactor and only controls timing of operation of the circuit shown in FIG. 1 or 2.

The control circuit 8 is a type of a sequence circuit, and the neutron flux signal is desired from either a neutron detector, heating detector, gamma ray detector or an alpha particle detector. The detector is connected to terminal 1 shown in FIG. 1 or 2 through a D.C. amplifier (not shown).

In such a manner as described above, through fixing anew the frequencies of oscillators 2 and 3 alternatively every time difference $\Delta t$, the period of a nuclear reactor can be measured in succession. Further, when a printer mechanism is coupled with a digital frequency-and-period meter a successive recording of the printer can be effected. The printer mechanism is connected to the above-described control oscillator, but it is not essential in the system.

In FIG. 2 a modification handling a difference of frequency between the two frequencies which correspond to the input at every time difference $\Delta t$, is shown. In FIG. 2 reference number 1 designates an input terminal of a signal proportional to the neutron flux, reference number 2 designates an oscillator generating a frequency proportional to the logarithm of the input signal, and, reference numbers 3 and 4 designate gates which connect the output of oscillator 2 to counters 5 and 6, respectively. Reference number 7 is an indicator and reference number 8 is a control circuit which controls the system for measuring the period of a nuclear reactor described in FIG. 2.

In FIG. 2 the oscillating frequencies of oscillator 2 are fixed at values determined by the signal from input 1 corresponding to the neutron flux at each time difference $\Delta t$ as determined by control signal 9 coming from control circuit 8. At this instant, in counter 5 information corresponding to the frequency of oscillator 2 at a time earlier time difference $\Delta t$ is stored. At first, the number of counts stored in counter 5 is transferred to counter 6 by means of signals 12 and 13 coming from control circuit 8 and is subjected to a complementary operation. Then, gates 3 and 4 are opened for a predetermined time interval by means of signals 10 and 11 coming from control circuit 8 so that the output of oscillator 2 is transmitted to counters 5 and 6, respectively. Then the number of counts corresponding to a frequency at this time is stored in counter 5, said counts to be transferred to counter 6 time difference $\Delta t$ later. In counter 6, counts corresponding to the complement of the count stored earlier by time difference $\Delta t$ has been stored and to this count a count corresponding to a frequency of the oscillator at the present time is added; therefore, a number of counts corresponding to the difference of the two frequencies of oscillator 2 between time difference $\Delta t$ is stored. Counters 5 and 6 are electronic counters provided with flip-flop circuits and a binary system. In the alternative, a binary coded decimal system can be utilized when the system is arranged to obtain a complement by reversing the phase of each stage. The information is stored in a flip-flop circuit in counter 5 or 6 in FIG. 2. The content is transferred to indicator 7 so that the inverse period of the reactor is displayed digitally.

Indicator 7 is an instrument which can memorize and indicate the content of counter 6. A typical embodiment of indicator 7 is a combination of the flip-flop circuit and the indicator tube. The code used in indicator 7 can be either binary or decimal and can include a binary-decimal conversion.

The control circuit shown in FIG. 2 is a simple sequence control circuit similar to the circuit shown in FIG. 1. Signal 9 is not necessarily required in the system shown in FIG. 2, because counters 5 and 6 count only during a specified time interval as determined by gates 3 and 4 and control signals 10 and 11 from controller 8. Thus, input terminal 1 may be constantly applied to the oscillator.

The frequency and the period of an oscillation can be measured by the same method; therefore, it is possible that the clock signal coming from control circuit 8 can be counted by counters 5 and 6 by making the oscillation period of oscillator 2 proportional to the neutron flux and by opening gates 3 and 4 in response to the signal coming from oscillator 2, in FIG. 2, to feed clock pulses from 8 to the counters. Obviously, in this event the frequency of the clock pulses must be greater than the frequency of oscillator 2.

Figure 3:
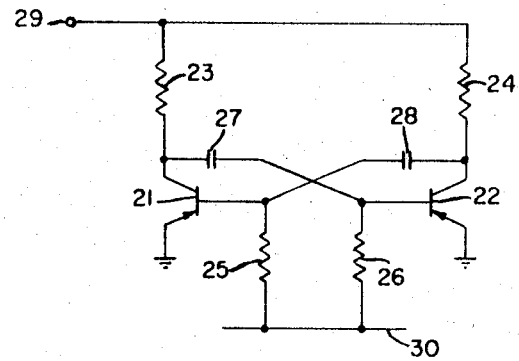
FIG. 3 is an embodiment of a connection diagram of the oscillator used in the system shown in FIG. 2.

In FIG. 3, an embodiment of the period of an oscillation proportional to the logarithm of an analog input is shown as a transistor free running multivibrator with the switching and holding circuitry on the input side thereof being omitted. In FIG. 3, reference number 29 designates an input terminal of a signal proportional to the neutron flux and reference numbers 21 and 22 designate transistors with the same characteristic. Resistors 23, 24, 25 and 26 are of equal resistance and capacitors 27 and 28 are of equal capacitance.

Assuming that the voltage of the electric source 30 is $E_B$ and the voltage applied to input terminal 29 is $E_C$, the period T of the oscillation of the free running multivibrator is represented by Equation 8.

$$T = K_3 ln \frac{E_C}{E_B} \quad (8)$$

where $K_3$=constant.

In voltage $E_C$ is made proportional to the neutron flux, an oscillator having the period of an oscillation proportional to the logarithm of the neutron flux is obtained.

An embodiment of an oscillator having a frequency proportional to the logarithm value of an analog input is provided by designing the characteristic between the rotation angle and the capacitance of a variable capacitor under the condition that the relation between the rotation angle of the variable capacitor and the frequency of the oscillation is logarithmic.

Figure 4:
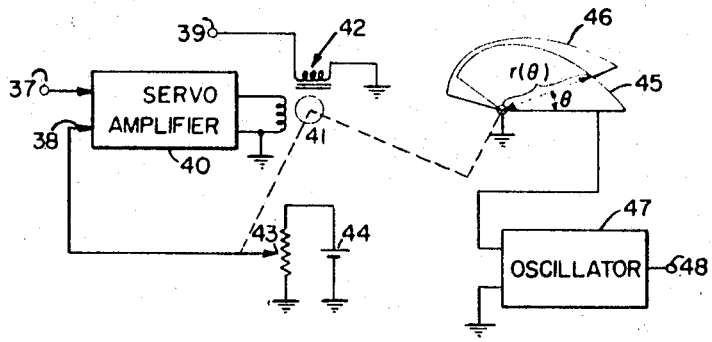
FIG. 4 is a skeleton diagram of an embodiment of the system of the invention.

In FIG. 4, which also omits the switching and holding circuitry, reference numeral 37 designates a terminal into which an input signal proportional to the neutron flux is applied, 38 a terminal into which an input signal for position feedback is applied and 39 a terminal into which a hold input signal is fed for fixing oscillator 47. Reference numeral 40 designates a servo amplifier, 41 a servo motor, 42 a magnetic brake, 43 a resistor used for the position of feedback, 44 an electrical source for resistor 43, 45 the stator of a variable capacitor, 46 the rotor of a variable capacitor, 47 an oscillator and 48 an output terminal of oscillator 47.

The variable capacitor comprised of stator 45 and rotor 46 is a capacitor used for the tank circuit of oscillator 47.

The shape of the variable capacitor is designed so that oscillation frequency $f$ is expressed by the following Equation 9:

$$f = K_4 ln \theta$$

where $K_4$=constant.

It is noted by the art in the field of the high frequency engineering that effective radius $\gamma(\theta)$ of the variable capacitor should satisfy the following Equation 10:

$$\gamma(\theta) = \frac{K_5}{\theta^{1/2}(ln\theta)^{3/2}}$$

where $K_5$=constant.

Servomotor 41 rotates the variable capacitor by the angle proportional to the input at input terminal 37 through the position feedback loop comprised of servo amplifier 40, resistor 43 and electrical source 44. An oscillation having an oscillation frequency proportional to the logarithm of the input at input terminal 37 appears at output terminal 48. Magnetic brake 42 is utilized to stop servomotor 41 in order to temporarily fix the oscillation frequency by the signal coming from terminal 39, and magnetic brake 42 is not necessarily required when the system shown in FIG. 2 is used. It is noted that the shape of the variable resistor is made so that the oscillation frequency is proportional to the logarithm of the rotating angle of the variable capacitor.

In accordance with the present system for measuring the effective reactivity of the material in a reactor is easily obtained by measuring the period of the reactor, because the present invention made it also possible to measure the period of a nuclear reactor in which the power level of said reactor is changed extremely slowly.

As described above, according to the present invention, as the period of a reactor can be measured in the form of mean value for each time difference $\Delta t$, it is possible to measure a long period which, due to noise, could not be measured by the prior art.

It should be understood that the embodiment herein shown and described, represents a form of the invention presently preferred, but that the scope of the invention is not limited to the precise details herein shown but is to be ascertained by reference to the appended claims.

We claim:

1. A system for measuring the period of a nuclear reactor by means of frequency conversion comprising: an oscillator having an oscillation frequency varying proportionally to the logarithm of an input signal; a first counting circuit for counting the output frequency of said oscillator; a first gate means for switching on and off the output of said oscillator entering into the first counting circuit; a second counting circuit for receiving the result counted in the first counting circuit and for counting the output frequency of said oscillator; a second gate for switching on and off the outputs of said oscillator entering into the second counting circuit; an indicating circuit for receiving and indicating the result of the second counting circuit; and a circuit for controlling the sequence of said measurement.

2. A system for measuring the period of a nuclear reactor by means of frequency conversion comprising: an oscillator having an oscillation frequency varying proportionally to the logarithm of an input signal; a first gate means switched on and off by an output of said oscillator; a first counting circuit for counting clock pulses coming from a control circuit passing through said first gate; a second counting circuit for receiving the result counted in the first counting circuit and for counting the clock pulses; a second gate means for switching on and off the clock pulses to said second counting circuit in accordance with the output of said oscillator; an indicating circuit for receiving and indicating the result of the second counting circuit; and a circuit for controlling the sequence of said measurement.

3. A system for measuring the period of a nuclear reactor by means of frequency conversion comprising: a pair of oscillators, each having an oscillation frequency varying proportional to the logarithm of an input signal; control circuit means for connecting said oscillators to said input signal during respective separated time periods and for holding the oscillation frequencies of said oscillators constant between said respective time periods; a mixer for making a signal representing the difference of the temporarily fixed frequencies of said two oscillators; a filter for transmitting the difference signal from said mixer; a gate means connected to the output of said filter for blocking or passing said output of said filter; a digital frequency meter for measuring said difference signal; and a circuit means for controlling the sequence of said measurements; wherein said oscillator includes a variable capacitor having a shape for generating an oscillation frequency proportional to the logarithm of the rotational angle of said capacitor and servo means controlling the oscillating frequency by applying a rotational angle proportional to the input to said servo means.

References Cited

UNITED STATES PATENTS

| | | |
|---|---|---|
| 2,851,596 | 9/1958 | Hilton. |
| 2,999,205 | 9/1961 | Sichak et al. _____ 324—79 |
| 3,069,545 | 12/1962 | Lide et al. _____ 250—83.1 |
| 3,222,521 | 12/1965 | Einfeld _____ 250—83.1 |
| 3,227,952 | 1/1966 | Proebster et al. _____ 324—79 |

RUDOLPH V. ROLINEC, *Primary Examiner.*

P. F. WILLE, *Assistant Examiner.*

U.S. Cl. X.R.

324—79